(12) United States Patent
Wang et al.

(10) Patent No.: US 11,359,945 B2
(45) Date of Patent: Jun. 14, 2022

(54) INSPECTION DEVICE AND METHOD FOR SUBWAY TUNNELS BASED ON THREE-DIMENSIONAL LASER SCANNING

(71) Applicant: Nanjing University of Aeronautics and Astronautics, Jiangsu (CN)

(72) Inventors: Jun Wang, Jiangsu (CN); Dawei Li, Jiangsu (CN); Yuxiang Wu, Jiangsu (CN); Cheng Yi, Jiangsu (CN); Xu Xu, Jiangsu (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 17/169,529

(22) Filed: Feb. 7, 2021

(65) Prior Publication Data

US 2021/0325213 A1    Oct. 21, 2021

(30) Foreign Application Priority Data

Apr. 21, 2020  (CN) .......................... 202010319675.8

(51) Int. Cl.
*B61D 15/12*    (2006.01)
*G01C 7/06*    (2006.01)
*G01D 21/02*    (2006.01)
*G01N 21/88*    (2006.01)

(52) U.S. Cl.
CPC ............. *G01D 21/02* (2013.01); *B61D 15/12* (2013.01); *G01C 7/06* (2013.01); *G01N 21/8803* (2013.01)

(58) Field of Classification Search
CPC ......... G01S 17/86; G01S 19/43; G01D 21/02; B61D 15/12; B61D 15/00; G01C 7/06; G01N 21/8803; B61K 9/02; B61C 3/00; G01B 11/16

See application file for complete search history.

(56) References Cited

U.S. PATENT DOCUMENTS

| 2005/0021227 | A1 | 1/2005 | Matsumoto et al. |
| 2020/0025578 | A1* | 1/2020 | Wygant .................. G01S 17/86 |
| 2020/0208995 | A1* | 7/2020 | Hou ........................ G01S 19/43 |

FOREIGN PATENT DOCUMENTS

| CN | 203940818 U | 11/2014 |
| CN | 105946878 A | 9/2016 |
| CN | 107128659 A | 9/2017 |

(Continued)

OTHER PUBLICATIONS

Xu, et al. CN-107941151-A Machine Translation (Year: 2018).*

*Primary Examiner* — Lee A Holly (57) ABSTRACT

An inspection device for subway tunnel based on three-dimensional laser scanning includes a three-dimensional laser scanner, an adaptive structure of a track trolley, a power control module for the track trolley, a photoelectric sensor and a body of the track trolley. The power control module is arranged on the body. A support rod is vertically arranged on the power control module, and the three-dimensional laser scanner is mounted at a top of the support rod. The adaptive structure is symmetrically arranged at two sides of the body of the track trolley, and the photoelectric sensor is arranged in the body of the track trolley. The inspection device is designed to be modular, which is convenient to carry and repair, and easy to mount. In addition, the inspection device has low labor cost due to less manual intervention, and the inspection efficiency can be improved.

3 Claims, 5 Drawing Sheets

(56) References Cited

FOREIGN PATENT DOCUMENTS

| CN | 107289900 A |   | 10/2017 |
|----|-------------|---|---------|
| CN | 107941151 A | * | 4/2018  |
| CN | 107941151 A |   | 4/2018  |
| CN | 109131430 A |   | 1/2019  |
| CN | 110496397 A |   | 11/2019 |

* cited by examiner

INSPECTION DEVICE AND METHOD FOR SUBWAY TUNNELS BASED ON THREE-DIMENSIONAL LASER SCANNING

CROSS-REFERENCE TO RELATED APPLICATIONS

This application claims the benefit of priority from Chinese Patent Application No. 202010319675.8, filed on Apr. 21, 2020. The content of the aforementioned application, including any intervening amendments thereto, is incorporated herein by reference in its entirety.

TECHNICAL FIELD

The present application relates to tunnel inspection, in particular to an inspection device and an inspection method based on three-dimensional laser scanning.

BACKGROUND

Three-dimensional laser scanning technology, also known as real-scene duplication technology, is based on a principle of laser distance measurement, in which a stable and accurate horizontal automatic motor is adopted to record information such as three-dimensional coordinates, reflectivity and texture of points densely distributed on surfaces of measured objects. In this way, a three-dimensional model of the measured target and various drawing data such as lines, surfaces, and bodies are rapidly reconstructed. A laser transmitter lens of a three-dimensional laser scanner is rotatable in vertical planes, and the automatic motor drives the scanner body to rotate in the horizontal direction, so that a 360-degree three-dimensional scene scanning can be achieved.

The three-dimensional laser scanner is capable of scanning sections. The laser transmitter rotates in the vertical plane, and the three-dimensional laser scanner does not rotate in the horizontal direction. In terms of this function, the three-dimensional laser scanner can be applied for mobile scanning in the tunnel to analyze the state of the tunnel section.

When scanning sections of scenes such as tunnels, the three-dimensional laser scanner needs to be fixed on a certain platform, and the three-dimensional laser scanner is fixed relative to the mobile platform.

In order to continuously scan the section of the tunnel, the three-dimensional scanner is generally mounted on a trolley that can run along tracks. The scanning results are greatly affected by the stable operation of the trolley. Therefore, there is an urgent need to provide a trolley that can ensure the stable operation of the platform when the three-dimensional laser scanner scans the sections of the tunnel.

When the subway tunnel is built, due to various factors such as geological conditions, construction along the road, train operation, structural aging and hydrological conditions, the subway tunnel gradually deforms, for example, convergence of the tunnel diameter and the collapse of the top of the tunnel happen, which causes an adverse effect on the safety of subway operations. Therefore, detection and inspection should be frequently carried out to inspect the status of subway tunnels.

In traditional manual measurement process of tunnel convergence, a three-dimensional laser scanner is adopted for stand-on scanning, which has low efficiency and high labor cost, and does not meet the requirements of short window period of night operation during the current track transportation. The overall accuracy of the existing automatic tunnel scanning system is greatly affected by the running stability of the trolley. Therefore, there is an urgent need to provide a high-efficiency and high-precision acquisition device to monitor the deformation of the subway tunnel.

SUMMARY OF THE DISCLOSURE

The present disclosure aims to provide an inspection device and an inspection method for subway tunnel based on three-dimensional laser scanning, to overcome the defects in the prior art. The existing three-dimensional laser scanner has low efficiency and high labor cost, and does not meet the requirements of short window period of night operation during the current track transportation.

Technical solutions of the present disclosure are described as follows.

Provided is an inspection device for subway tunnel based on three-dimensional laser scanning, comprising:
a three-dimensional laser scanner;
an adaptive structure of a track trolley;
a power control module for the track trolley;
a photoelectric sensor; and
a body of the track trolley;
wherein the power control module is arranged on the body; a support rod is vertically arranged on the power control module, and the three-dimensional laser scanner is mounted at a top of the support rod; the adaptive structure is symmetrically arranged at two sides of the body of the track trolley, and the photoelectric sensor is arranged in the body of the track trolley.

In some embodiments, the three-dimensional laser scanner comprises:
a scanner body; and
a fixed mounting head;
wherein the fixed mounting head is arranged at a bottom of the scanner body, and fixedly connected to the scanner body through a bolt; a top end of the support rod is inserted into the fixed mounting head in a fixed manner, and the support rod 6 is fixedly connected to the body of the track trolley through a bolt.

In some embodiments, the adaptive structure comprises:
a balance side rod;
a plurality of balance rockers;
a guide wheel; and
a guide frame;
wherein the balance side rod is horizontally fixed at a front side of the body of the track trolley; each of the balance rockers is L-shaped, and two ends of the balance side rod are respectively hinged with bending points of the balance rockers of the adaptive structure arranged on both sides of the body of the track trolley; a vertical part and a horizontal part of each of the balance rockers are hinged with each other; the vertical part of each of the balance rockers is screwed to the body of the track trolley; and an end of the horizontal part of each of the balance rockers is hinged to a middle of the guide frame; the guide wheel is mounted at an end of the guide frame far away from the body of the track trolley, and the guide frame is screwed to the body of the track trolley at an end close to the body of the track trolley; the guide frame of the adaptive structure adaptively adjusts a height and an offset angle of the track trolley along a track through the balance side rod and the balance rockers; and the guide wheel adaptively fits the track through the balance side rod and the balance rockers.

In some embodiments, the power control module comprises:

a control box;
a display;
an industrial control; and
a microprocessor printed circuit board (PCB);

wherein the display and the industrial control are mounted on an upper surface of the control box, and the microprocessor PCB is mounted inside the control box.

In some embodiments, the industrial control is an integrated device with low power consumption, and is connected to the three-dimensional laser scanner and the power control module through wires to control data collection of the three-dimensional laser scanner and the travelling of the track trolley, respectively; and the industrial control is connected to the photoelectric sensor through an RS232 serial port to control the operation of the photoelectric sensor, receive data from the photoelectric sensor, and fuse multi-source data.

In some embodiments, the body of the track trolley comprises:

four arms;
a plurality of wheels;
two motor shafts;
four arm bearings;
a motor assembly;
a plurality of fans;
a main body; and
two fixing frames;

wherein the main body is arranged under the power control module, and the fans are arranged on a side and a bottom of the main body; the four arm bearings are respectively symmetrically arranged at ends of two sides of the main body; the four arms are screwed to the main body through the four arm bearings; the four arm bearings allow the body of the track trolley to be foldable;

the two fixing frames are respectively arranged on both sides of the main body of the track trolley, and ends of two arms on each side of the main body are fixed on a corresponding fixing frame; the vertical part of each of balance rockers is screwed to an end of each of front arms on both sides of the main body; an end of the guide frame close to the body of the track trolley is screwed to the fixing frame; and the motor assembly is arranged inside and penetrates through the main body of the track trolley to connect one end of each of the two motor shafts, and the other ends of the two motor shafts pass through the two fixing frames on both sides of the main body of the track trolley, and are fixed with wheels, respectively.

In some embodiments, the motor assembly comprises:

a motor;
a driving wheel;
a driven wheel;
a speed measuring encoder disk; and
a differential box;

wherein the motor is fixed at an upper part of the body of the track trolley; the motor is in transmission connection with the driving wheel, and the driving wheel meshes with the driven wheel; the driven wheel is in transmission connection with the speed measuring encoder disk and the differential box in turn; two sides of the differential box are respectively connected to the two motor shafts on both sides of the body of the track trolley through two transmission shafts; the photoelectric sensor is arranged on the speed measuring encoder disk; the photoelectric sensor is a grating encoder, and the photoelectric sensor output a pulse signal for collecting position and mileage information of the track trolley in a tunnel.

The present disclosure further provides an inspection method for subway tunnel based on three-dimensional laser scanning, comprising:

1) presetting a running speed of a track trolley through an industrial control of a power control module;

2) controlling the industrial control of the power control module to send a start instruction to a three-dimensional laser scanner, a photoelectric sensor and a body of the track trolley; and turning on the motor to drive the body of the track trolley to start moving; and 3) letting the three-dimensional laser scanner, the photoelectric sensor and the trackcar body receive the start instruction from the industrial control; continuously collecting point cloud data of a tunnel segment by the three-dimensional laser scanner; transmitting the point cloud data to the industrial control in real time; and storing the point cloud data; collecting mileage data by the photoelectric sensor in real time; transmitting the mileage data to the industrial control; and displaying the mileage data on the display in real time; and making the body of the track trolley steadily travel.

In some embodiments, in the step 1, a maximum running speed can be set to be 6 km/h, and real-time stepless speed regulation is carried out during the operation of the track trolley.

In some embodiments, during the collection of the three-dimensional laser scanner in the step 3, an emitted laser rotates in a vertical plane perpendicular to a track of a subway, and the three-dimensional laser scanner moves for scanning.

Compared to the prior art, the present invention has the following beneficial effects.

1) The guide frame of the adaptive structure can adaptively adjust a height and an offset angle of the track trolley along a track through the balance side rod and the balance rocker. The guide wheel can adaptively fit the track through the balance side rod and the balance rocker, which realizes the adaptive adjustment of the track trolley, so that the vehicle can fit the track in real time during operation, thereby improving the stability of the device and the accuracy of data collection.

2) The power control module can control the track trolley to autonomously run at a constant speed. The body and the mounting platform of the track trolley are designed to be stable. The three-dimensional laser scanner can collect deformation data of the tunnel section, and can be measured by a variety of indexes, ensuring high accuracy of the collected data.

3) The guide frame is screwed to the fixing frame. The folding arm and the guide frame make the body of the track trolley foldable, so it is convenient to carry.

4) The inspection device of the present disclosure is designed to be modular, which is convenient to carry and repair and easy to mount. In addition, the inspection device has low labor cost due to less manual intervention, and the inspection efficiency can be improved.

BRIEF DESCRIPTION OF THE DRAWINGS

The present disclosure will be described below with reference to the accompanying drawings, from which technical solutions in the embodiments of the present disclosure will be clearer. Obviously, the drawings in the following description are only some embodiments of the present disclosure. For those of ordinary skill in the art, other drawings can be obtained based on these drawings without creative work.

DETAILED DESCRIPTION OF EMBODIMENTS

The technical solutions of an embodiment of the present disclosure will be clearly and completely described below.

Figure 1:
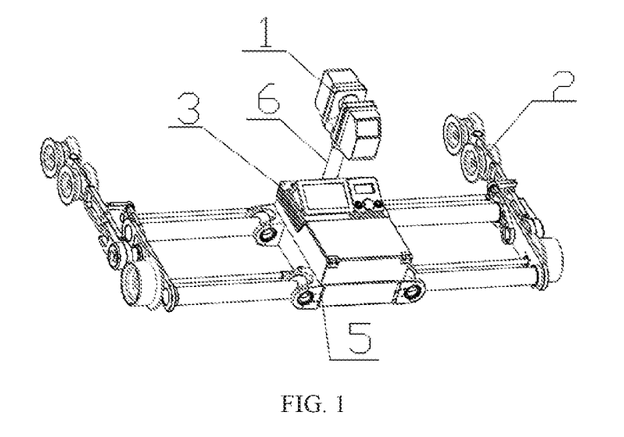
FIG. 1 is a structural diagram an inspection device for subway tunnel based on three-dimensional laser scanning according to an embodiment of the present disclosure.

The present disclosure provides an inspection device for subway tunnel based on three-dimensional laser scanning. As shown in FIG. 1, the inspection device includes a three-dimensional laser scanner 1, an adaptive structure 2 of a track trolley, a power control module 3 for the track trolley, a photoelectric sensor 4 and a body 5 of the track trolley. The power control module 3 is arranged on the body 5. A support rod 6 is vertically arranged on the power control module 3, and the three-dimensional laser scanner 1 is mounted at a top of the support rod 6. The adaptive structure 2 is symmetrically arranged at two sides of the body 5 of the track trolley, and the photoelectric sensor 4 is arranged in the body 5.

Figure 2:
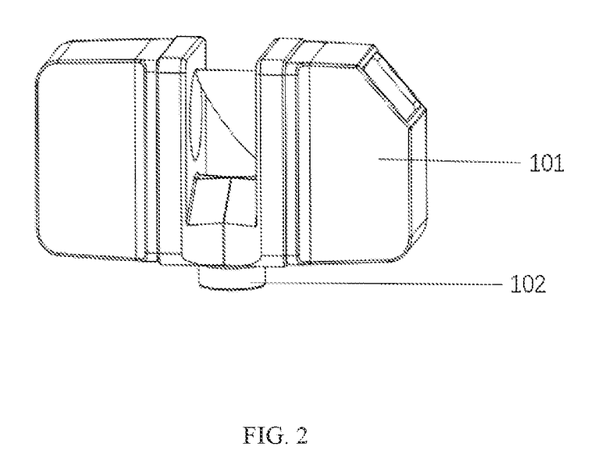
FIG. 2 is a schematic diagram of a three-dimensional laser scanner in FIG. 1.

As shown in FIG. 2, the three-dimensional laser scanner 1 includes a scanner body 101 and a fixed mounting head 102. The fixed mounting head 102 is arranged at a bottom of the scanner body 101, and fixedly connected to the scanner body through a bolt. A top end of the support rod 6 is inserted into the fixed mounting head 102 in a fixed manner, and the support rod 6 is fixedly connected to the body 5 of the track trolley through a bolt.

Figure 3:
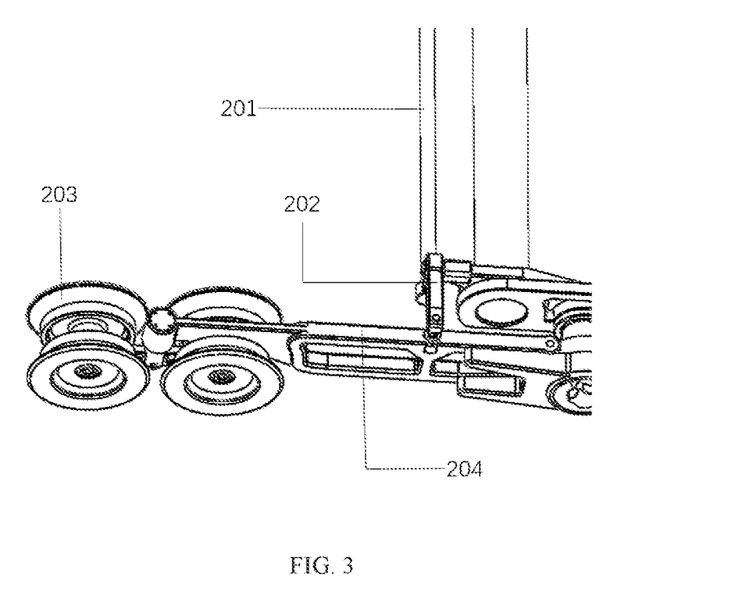
FIG. 3 is a schematic diagram of an adaptive structure of a track trolley in FIG. 1.

As shown in FIG. 3, the adaptive structure 2 includes a balance side rod 201, balance rockers 202, a guide wheel 203 and a guide frame 204. The balance side rod 201 is horizontally fixed at a front side of the body 5. Each of the balance rockers 202 is L-shaped, and two ends of the balance side rod 201 are respectively hinged with bending points of the balance rockers 202 of the adaptive structure 2 arranged on both sides of the body 5 of the track trolley. A vertical part and a horizontal part of each of the balance rockers 202 are hinged with each other. The vertical part of each of the balance rockers 202 is screwed to the body 5 of the track trolley, and an end of the horizontal part of each of the balance rockers 202 is hinged to a middle of the guide frame 204. The guide wheel 203 is mounted at an end of the guide frame 204 far away from the body 5 of the track trolley, and the guide frame 204 is screwed to the body 5 at an end close to the body 5 of the track trolley. The guide frame 204 of the adaptive structure 2 can adaptively adjust a height and an offset angle of the track trolley along a track through the balance side rod 201 and the balance rocker 202. The guide wheel 203 can adaptively fit the track through the balance side rod and the balance rocker, which realizes the adaptive adjustment of the track trolley, so that the vehicle can fit the track in real time during operation, thereby improving the stability of the device and the accuracy of data collection.

Figure 4:
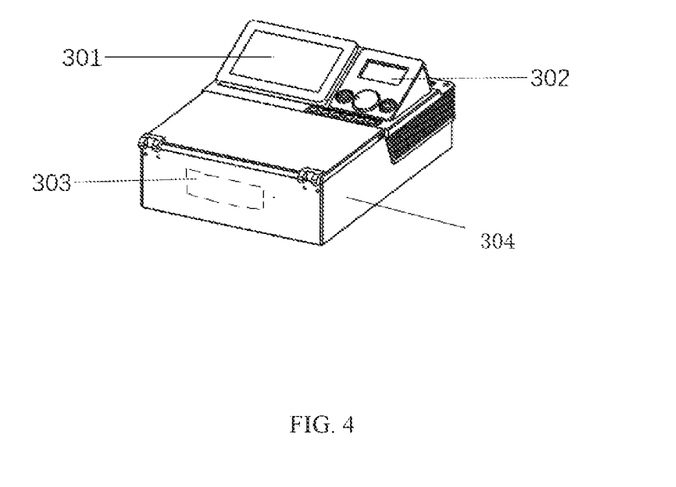
FIG. 4 is a schematic diagram of a power control module of the track trolley in FIG. 1.

As shown in FIG. 4, the power control module 3 includes a control box 304, a display 301, an industrial control 302 and a microprocessor printed circuit board (PCB) 303. The display 301 and the industrial control 302 are mounted on an upper surface of the control box 304, and the microprocessor PCB 303 is mounted inside the control box 304. A battery is provided inside the control module 3 and configured to supply power to the track trolley. The power control module 3 can control the track trolley to autonomously run at a constant speed. The body and the mounting platform of the track trolley are designed to be stable. The three-dimensional laser scanner 1 can collect deformation data of the tunnel section, and can be measured by a variety of indexes, ensuring high accuracy of the collected data.

The industrial control 302 is an integrated device with low power consumption, and is connected to the three-dimensional laser scanner 1 and the power control module 3 through wires to control the data collection of the three-dimensional laser scanner 1 and the travelling of the track trolley, respectively. At the same time, the industrial control 302 is connected to the photoelectric sensor 4 through an RS232 serial port to control the operation of the photoelectric sensor 4, receive data from the photoelectric sensor 4, and fuse multi-source data.

Figure 5:
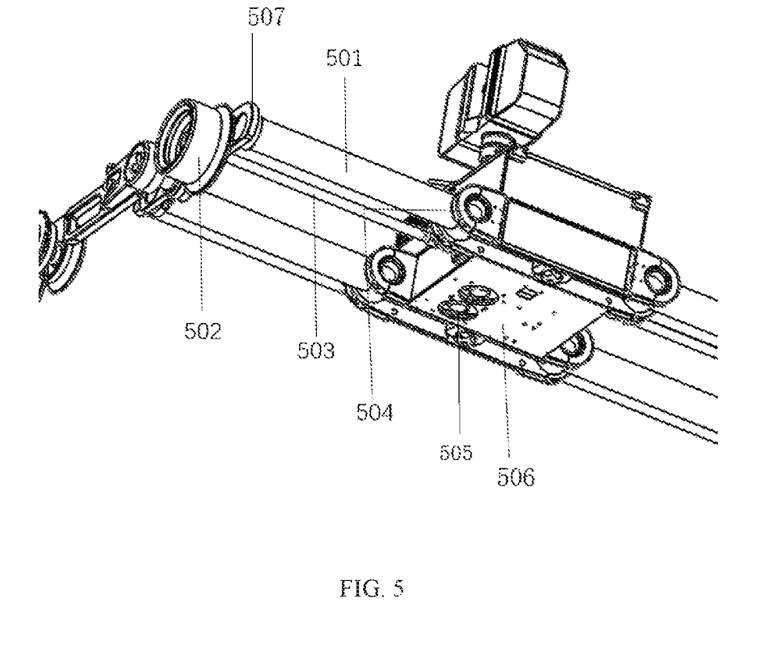
FIG. 5 is a schematic diagram of a body of the track trolley in FIG. 1.
Figure 6:
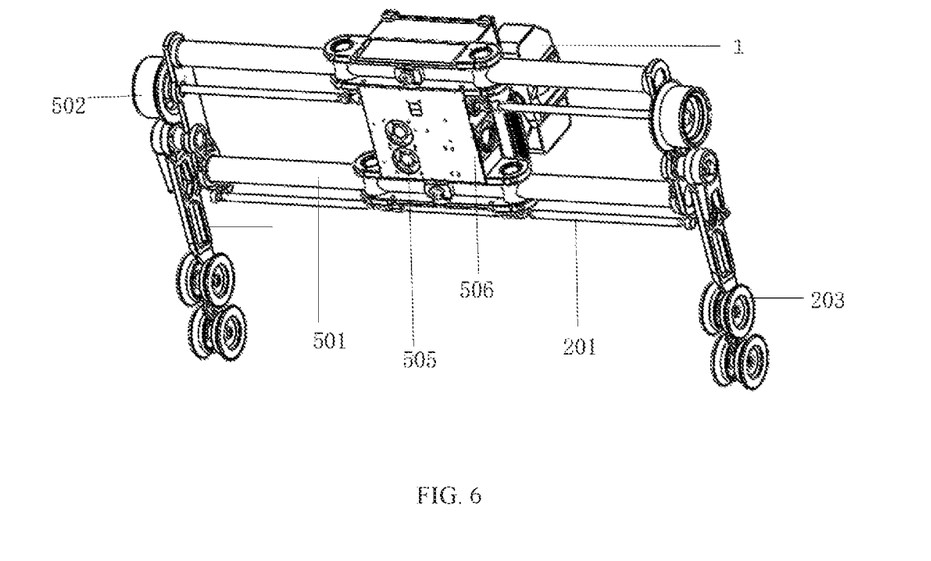
FIG. 6 is a bottom view of the inspection device for subway tunnel based on three-dimensional laser scanning according to an embodiment of the present disclosure.

As shown in FIGS. 5-6, the body 5 of the track trolley includes four arms 501, a plurality of wheels 502, two motor shafts 503, four arm bearings 504, a motor assembly, a plurality of fans 505, a main body 506 and two fixing frames 507. The main body 506 is arranged under the power control module 3, and the fans 505 are arranged on a side and a bottom of the main body. The four arm bearings 504 are respectively symmetrically arranged at ends of two sides of the main body 506. The four arms 501 are screwed to the main body 506 through the four arm bearings 504. The arm bearings 504 allow the body 5 of the track trolley to be foldable. The two fixing frames 507 are respectively arranged on both sides of the main body 506 of the track trolley, and ends of two arms 501 on each side of the main body 506 are fixed on a corresponding fixing frame 507. The vertical part of each of balance rockers 202 is screwed to an end of each of front arms 501 on both sides of the main body 506. An end of the guide frame 204 close to the body 5 of the track trolley is screwed to the fixing frame 507. The folding arm 501 and the guide frame 204 make the body 5 of the track trolley foldable, so it is convenient to carry. The motor assembly is arranged inside and penetrates through the main body 506 of the track trolley to connect one end of each of the two motor shafts 503. The other ends of the two motor shafts 503 pass through the two fixing frames 507 on both sides of the main body 506 of the track trolley, and are fixed with wheels 502, respectively.

Figure 7:
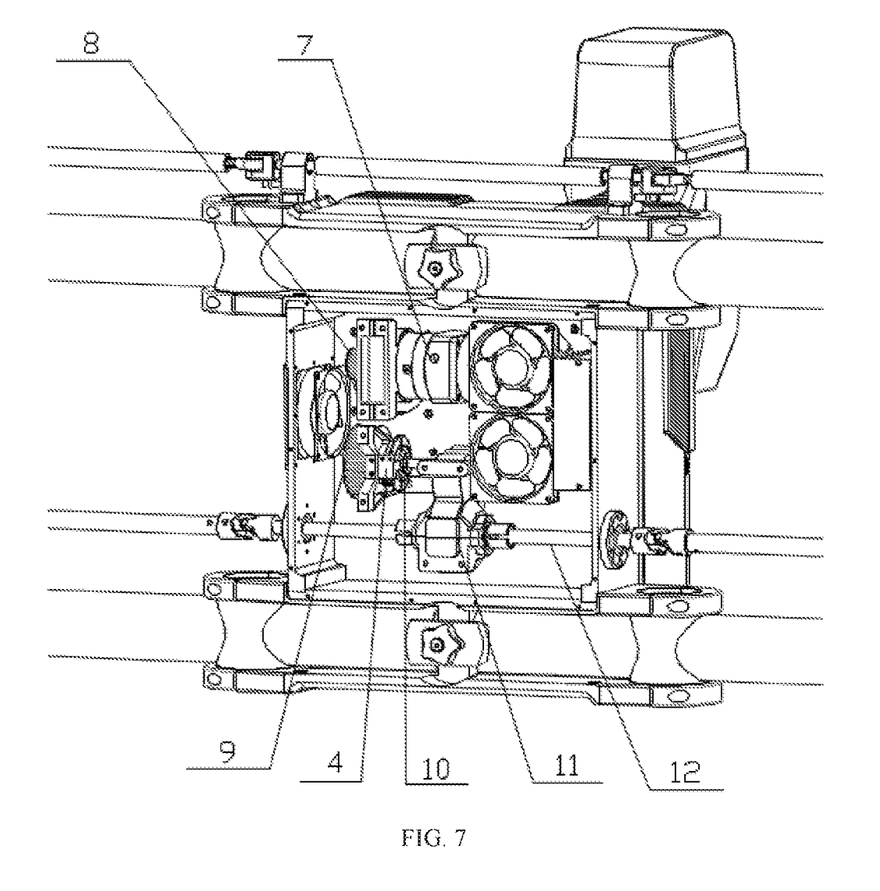
FIG. 7 schematically shows an interior of a main body of the track trolley in FIG. 6.
Figure 8:
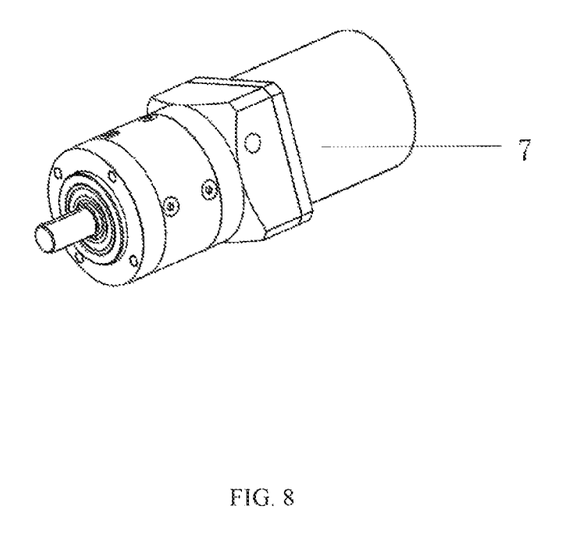
FIG. 8 is a schematic diagram of a motor in FIG. 7.

As shown in FIG. 7, the motor assembly includes a motor 7, a driving wheel 8, a driven wheel 9, a speed measuring encoder disk 10 and a differential box 11. The motor 7 is fixed at an upper part of the body 5 of the track trolley. The motor 7 is in transmission connection with the driving wheel 8. The driving wheel 8 meshes with the driven wheel 9. The driven wheel 9 is in transmission connection with the speed measuring encoder disk 10 and the differential box 11 in turn. Two sides of the differential box 11 are respectively connected to the two motor shafts 503 on both sides of the body 5 of the track trolley through two transmission shafts 12. The photoelectric sensor 4 is arranged on the speed measuring encoder disk 10. The motor 7 is a coreless geared motor, as shown in FIG. 8. The photoelectric sensor 4 is a high-precision grating encoder, and the photoelectric sensor 4 outputs a pulse signal for collecting position and mileage information of the track trolley in a tunnel.

The present disclosure further provides an inspection method for subway tunnels based on three-dimensional laser scanning, which includes the following steps.

1) The construction personnel use the industrial control 302 of the power control module 3 to preset a running speed of the track trolley. A maximum running speed can be set to be 6 km/h, and real-time stepless speed regulation can be carried out during the operation of the track trolley.

2) The industrial control 302 of the power control module is controlled to send a start instruction to the three-dimensional laser scanner 1, the photoelectric sensor 4 and the body 5 of the track trolley, and the motor 7 is turned on to drive the body 5 of the track trolley to start moving.

3) The three-dimensional laser scanner 1, the photoelectric sensor 4 and the trackcar body 5 receive the start instruction from the industrial control. The three-dimensional laser scanner 1 continuously collects point cloud data of the tunnel segments and transmits the point cloud data to the industrial control 302 in real time, and the industrial control 302 stores the point cloud data. The photoelectric sensor 4 collects the mileage data in real time, transmits it to the industrial control and displays it on the display 301 in real time. The body 5 of the track trolley runs at a steady speed. During the collection of the three-dimensional laser scanner 1, an emitted laser rotates in a vertical plane perpendicular to the track of subway, and the three-dimensional laser scanner 1 moves for scanning.

The inspection device of the present disclosure is designed to be modular, which is convenient to carry and repair and easy to mount. In addition, the inspection device has low labor cost due to less manual intervention, and the inspection efficiency can be improved.

The above embodiments are illustrative of the present disclosure and not intended to limit the scope of the present disclosure. Various modifications and changes made by those of ordinary skill in the art without departing from the spirit and scope of the present disclosure shall fall within the scope of the application defined by the appended claims.

What is claimed is:

1. An inspection device for subway tunnel based on three-dimensional laser scanning, comprising:
   a three-dimensional laser scanner;
   an adaptive structure of a track trolley;
   a power control module for the track trolley;
   a photoelectric sensor; and
   a body of the track trolley;
   wherein the power control module is arranged on the body; a support rod is vertically arranged on the power control module, and the three-dimensional laser scanner is mounted at a top of the support rod; the adaptive structure is symmetrically arranged at two sides of the body of the track trolley, and the photoelectric sensor is arranged in the body of the track trolley;
   wherein the three-dimensional laser scanner comprises:
   a scanner body; and
   a fixed mounting head;
   wherein the fixed mounting head is arranged at a bottom of the scanner body, and fixedly connected to the scanner body through a bolt; a top end of the support rod is inserted into the fixed mounting head in a fixed manner, and the support rod 6 is fixedly connected to the body of the track trolley through a bolt.

2. An inspection device for subway tunnel based on three-dimensional laser scanning, comprising:
   a three-dimensional laser scanner;
   an adaptive structure of a track trolley;
   a power control module for the track trolley;
   a photoelectric sensor; and
   a body of the track trolley;
   wherein the power control module is arranged on the body; a support rod is vertically arranged on the power control module, and the three-dimensional laser scanner is mounted at a top of the support rod; the adaptive structure is symmetrically arranged at two sides of the body of the track trolley, and the photoelectric sensor is arranged in the body of the track trolley;
   wherein the body of the track trolley comprises:
   four arms;
   a plurality of wheels;
   two motor shafts;
   four arm bearings;
   a motor assembly;
   a plurality of fans;
   a main body; and
   two fixing frames;
   wherein the main body is arranged under the power control module, and the fans are arranged on a side and a bottom of the main body; the four arm bearings are respectively symmetrically arranged at ends of two sides of the main body; the four arms are screwed to the main body through the four arm bearings; the four arm bearings allow the body of the track trolley to be foldable;
   the two fixing frames are respectively arranged on both sides of the main body of the track trolley, and ends of two arms on each side of the main body are fixed on a corresponding fixing frame; the vertical part of each of balance rockers is screwed to an end of each of front arms on both sides of the main body; an end of the guide frame close to the body of the track trolley is screwed to the fixing frame; and
   the motor assembly is arranged inside and penetrates through the main body of the track trolley to connect one end of each of the two motor shafts, and the other ends of the two motor shafts pass through the two fixing frames on both sides of the main body of the track trolley, and are fixed with wheels, respectively.

3. An inspection device for subway tunnel based on three-dimensional laser scanning, comprising:
   a three-dimensional laser scanner;
   an adaptive structure of a track trolley;
   a power control module for the track trolley;
   a photoelectric sensor; and
   a body of the track trolley;
   wherein the power control module is arranged on the body; a support rod is vertically arranged on the power control module, and the three-dimensional laser scanner is mounted at a top of the support rod; the adaptive structure is symmetrically arranged at two sides of the body of the track trolley, and the photoelectric sensor is arranged in the body of the track trolley;
   wherein the motor assembly comprises:
   a motor;
   a driving wheel;
   a driven wheel;
   a speed measuring encoder disk; and
   a differential box;
   wherein the motor is fixed at an upper part of the body of the track trolley; the motor is in transmission connection with the driving wheel, and the driving wheel meshes with the driven wheel; the driven wheel is in transmission connection with the speed measuring encoder disk and the differential box in turn; two sides of the differential box are respectively connected to the two motor shafts on both sides of the body of the track trolley through two transmission shafts; the photoelectric sensor is arranged on the speed measuring encoder disk; the photoelectric sensor is a grating encoder, and the photoelectric sensor output a pulse signal for collecting position and mileage information of the track trolley in a tunnel.

\* \* \* \* \*